US005468531A

United States Patent [19]

Kikukawa et al.

[11] Patent Number: 5,468,531

[45] Date of Patent: Nov. 21, 1995

[54] ELASTIC FIXING ROLL

[75] Inventors: Hiroyasu Kikukawa; Hiroshi Kato, both of Okayama, Japan

[73] Assignee: Japan Gore-Tex, Inc., Japan

[21] Appl. No.: 245,298

[22] Filed: May 18, 1994

[30] Foreign Application Priority Data

May 18, 1993 [JP] Japan .................................... 5-139577

[51] Int. Cl.[6] ........................................................ B32B 1/08

[52] U.S. Cl. ....................... 428/36.5; 428/35.8; 428/36.8; 428/304.4; 428/316.6; 428/317.1; 428/332; 428/339; 428/376; 428/383; 428/421; 428/422; 428/423.1; 428/447; 492/53; 492/56

[58] Field of Search ................................. 428/35.6, 35.8, 428/36.5, 36.8, 304.4, 306.6, 308.4, 316.6, 317.1, 421, 422, 447, 332, 339, 376, 383, 423.1; 492/53, 56, 59; 430/98, 99; 355/290

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 174/102 R |
| 4,533,231 | 8/1985 | Shigenobu | 219/216 |
| 4,887,340 | 12/1989 | Kato et al. | 492/53 |
| 5,014,406 | 5/1991 | Kato et al. | 492/52 |
| 5,068,692 | 11/1991 | Menjo | 355/284 |
| 5,123,151 | 6/1992 | Uehara et al. | 492/56 |
| 5,180,899 | 1/1993 | Inasaki | 219/469 |
| 5,232,499 | 8/1993 | Kato et al. | 118/244 |
| 5,294,487 | 3/1994 | Ohashi et al. | 428/308.4 |

FOREIGN PATENT DOCUMENTS

| | | |
|---|---|---|
| 58-17129 | 2/1983 | Japan . |
| 59-172668 | 9/1984 | Japan . |
| 61-151676 | 7/1986 | Japan . |

*Primary Examiner*—Patrick J. Ryan
*Assistant Examiner*—Marie R. Yamnitzky
*Attorney, Agent, or Firm*—Gary A. Samuels

[57] ABSTRACT

An elastic fixing roll having an elastic, compliant body material and release surface material is disclosed. The body material comprises porous silicone rubber, fluorosilicone rubber, or fluorocarbon rubber foam, or a porous synthetic polymer foam reinforced with silicone rubber, fluorosilicone rubber, or fluorocarbon rubber. The release surface material is formed of porous polytetrafluoroethylene film containing silicone rubber, fluorosilicone rubber, or fluorocarbon rubber and is bonded to the body material by a non-continuous layer of adhesive. The elastic fixing roll has good strength, resilience, and heat resistance and is suitable for use in hot toner fixing assemblies of copying machines and printing machines

4 Claims, 1 Drawing Sheet

ELASTIC FIXING ROLL

FIELD OF THE INVENTION

The present invention relates to an elastic fixing roll, more particularly to an elastic roll suitable for use as a heating roll or pressure roll in a heated toner fixing assembly of a photocopy machine or printing machine.

BACKGROUND OF THE INVENTION

In a plain-paper copying (PPC) machine toner images applied to the surface of paper or other recording medium are fixated by application of heat and pressure. In certain PPC machines toner fixation is accomplished by passing the image-bearing recording medium between a hot thermal-fixation roll and a pressure roll to fuse the toner in place so that it is not easily removed from or is difficult to smear on the surface of the paper or other recording medium. When this type of thermal-fixation device is used the toner material is directly contacted by a roll surface and a portion of the toner adheres to the roll surface. Unless this is controlled, with subsequent rotation of the roll the adhered toner material may be redeposited on the recording medium resulting in undesirable offset images, stains, or smears; or, in severe cases, the recording medium may stick to the adhered toner material on the roll and become wrapped around the roll.

To perform satisfactorily in a thermal fixation assembly the material forming the pressing surfaces should be sufficiently temperature resistant to operate at the temperatures required to fuse the toners, capable of complying to and applying uniform pressure to the toner images, and have, or have imparted to their surface, release properties that minimize toner pickup. Additionally, these materials should be sufficiently durable in performing these functions to be cost-effective.

In the past, solid rolls consisting of elastic materials such as urethane rubber, ethylene propylene rubber, silicone rubber, or fluorocarbon rubber have been used. Such elastic materials, when used alone, suffer the drawback of having relatively poor release properties and toner particles, paper particles, and the like, would cling to the rolls and lead to reduced image quality and a shorter use-life. When used in conjunction with release agents, for example, silicone oils applied to their surfaces, or release agents present in oil-less toners, improved release properties were obtained, however, often at the expense of durability as many of the elastic materials were degraded by the release agents and failed prematurely.

To overcome these problems solid rolls of elastic materials with a covering layer of fluoropolymer film or shrink-fit tubing have come into use. Fluoropolymer materials such as tetrafluoroethylene/hexafluoropropylene copolymer (FEP), tetrafluoroethylene/(perfluoroalkyl) vinyl ether copolymer (PFA), and polytetrafluoroethylene (PTFE) are well known for their temperature resistance, chemical stability, and excellent release properties; and their use in solid rolls have resulted in improved release properties and heat resistance, although at considerable sacrifice of mechanical properties such as elasticity, compliance, and surface hardness.

New needs in the printing and copying industry, for example, the desire for higher printing and copying speeds, more compact and lighter equipment, and the desire to print or copy onto surfaces of non-uniform thickness such as are created by envelope flaps, and the like, are such that even the improved roll materials no longer perform entirely satisfactorily. Higher operating speed may require higher operating temperature in order to accomplish image fixation with a shorter residence time at temperature and pressure. Higher operating temperatures may lead to reduced use-life in the materials. Alternatively, to operate at high speeds but at lower temperature, the residence time at temperature and pressure can be increased by increasing the nip width between the pressing surfaces. Generally, this can be done by increasing the contact pressure, which can lead to premature failure of the material; or by increasing the diameter of the roll, which conflicts with the desire for compactness.

To address these needs rolls made of elastic materials in the form of flexible porous foams have been developed. Rolls made of elastic porous foam materials have elasticity and compliance properties which allow the nip width to be increased without increasing the contact pressure between the pressing surfaces or increasing the roll diameter, and can print or copy onto substrate surfaces of non-uniform thickness without creating wrinkles in the image-bearing substrate. However, when made of the elastomeric materials described above, they suffer the same drawbacks of poor release properties or degradation associated with release agents. When covered with a layer of fluoropolymer material as described above the elasticity and compliance of the elastic foam body are compromised as the higher hardness and rigidity of the covering layer prevents the elasticity and compliance properties of the elastomer foam from being adequately exploited. Furthermore, because of the disparity in the physical properties of the materials, substantial stress is developed at the interface between the covering layer and the foam body so that the covering layer tends to separate from the foam body, and failure occurs.

It is a purpose of the present invention to provide an elastic fixing roll which has excellent release properties, surface contact characteristics, heat resistance, and durability; and which can satisfactorily address the current needs described above.

SUMMARY OF THE INVENTION

An embodiment of the invention provides an elastic fixing roll comprising (a) a release surface material comprising porous polytetrafluoroethylene which has its pores impregnated with cross-linked synthetic rubber, and (b) an elastic porous body material of synthetic rubber foam; wherein the release surface material is adhered to the outer surface of the elastic porous body material by a non-continuous layer of adhesive.

A non-continuous layer of adhesive is used herein to indicate a layer of adhesive which is applied to a surface so as to not form a non-porous continuous film. For example, a layer applied to a surface as a pattern of discrete dots or lines, a porous non-woven web or mesh, or the like.

Another embodiment of the invention provides an elastic fixing roll comprising (a) a release surface material comprising porous polytetrafluoroethylene which has its pores impregnated with cross-linked synthetic rubber, (b) a porous body material comprising synthetic polymer foam, and (c) a reinforcing material of cross-linked synthetic rubber impregnated into the pores of the porous body material; wherein the release surface material is adhered to the outer surface of the elastic porous body material by a non-continuous layer of adhesive.

DETAILED DESCRIPTION OF THE INVENTION

By elastic, as used herein, is meant capable of returning to an initial form or state after deformation.

By rubber foam, as used herein, is meant a light, porous, spongy rubber form, also variously known as foam rubber or sponge rubber.

By porous, as used herein, is meant simply having pores or voids, and is not descriptive of a specific structure. The pores or voids may be totally enclosed within and separated one from another by a solid, for example, as in a closed-cell foam; or they may be interconnected and form a network of passages throughout a structure, for example, as in an open-cell foam; or they may be present in a combination of both open and closed cells.

Figure 1:
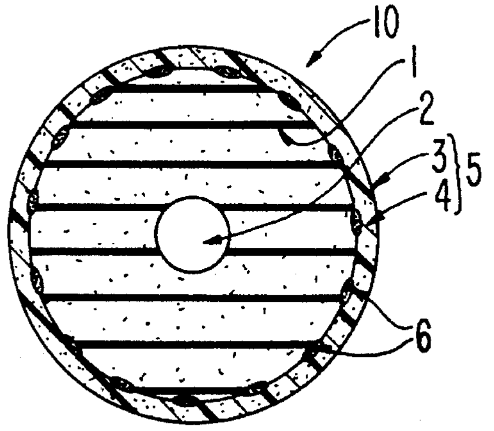
FIG. 1 is a cross-sectional view of an embodiment of the elastic fixing roll of the invention.

In FIG. 1 is shown an elastic fixing roll 10 of the invention in which an elastic porous body material 1 is axially mounted on a metal shaft 2. A release surface material 5 comprising a porous polytetrafluoroethylene film 3 impregnated with a synthetic rubber 4 is adhered to the outer surface of the body material 1 by a non-continuous layer of adhesive 6.

The elastic porous body material I can be made of a foamed elastomer having either an open-celled or close-celled structure. Preferably the foamed elastomer is silicone rubber, fluorosilicone rubber, or fluorocarbon rubber. The silicone rubber and fluorosilicone rubber may be of a room temperature curing (RTV) type, low temperature vulcanizing (LTV) type, high temperature vulcanizing (HTV) type, or ultra-violet radiation curing type. Materials, processes, and equipment needed to form the above-described materials into porous rubber foams are known in the art and are available commercially.

Among the RTV types of silicone rubber or fluorosilicone rubber are two liquid types which develop as a rubber after a curing reaction at room temperature. The first type is available as a liquid comprising a reactive polysiloxane or reactive fluoropolysiloxane, a cross-linker, and a curing catalyst. This type results in a rubber following a curing reaction with the moisture in air when exposed to air. Almost all of these first types of RTV silicone rubbers and fluorosilicone rubbers are condensation reaction types. Depending on the kind of cross-linker used, there are de-alcoholated types in which alcohol is produced as a by-product, deoximated types in which oxime is produced as a by-product, acetic acid-removed types in which acetic acid is produced as a by-product, as well as de-amidated, de-aminated, and de-acetonated types in which, respectively, amides, amines, and acetone are produced as by-products, and the like. In the case of de-alcoholated types, alkoxy groups undergo a hydrolysis reaction with the moisture in the air, and those parts in which alkoxy groups are present serve as the cross-linking sites, resulting in the gradual formation of a network structure which becomes the rubber. The other types also result in elastomers by similar reactions.

The second liquid type of RTV silicone rubber or fluorosilicone rubber consists of a primary agent in the form of a paste or liquid which contains a reactive polysiloxane or fluoropolysiloxane and a curing agent. The reactive polysiloxane or fluoropolysiloxane is allowed to react in the presence of a curing catalyst to form the rubber. The curing catalyst may be contained in either the primary agent or the curing agent. In contrast to the first type, this second type of RTV silicone rubber or fluorosilicone rubber is referred to as a deep-curing type in which the reaction proceeds completely. The curing mechanism is classified into condensation reaction types and addition reaction types. In the case of the condensation reaction types the cross-linkers used, the curing reactions, and the by-products produced are as described above. In the case of the addition reaction types, the mixing together of the primary agent, curing agent, and catalyst initiates the addition reaction which results in the rubber. No by-products are produced in this case.

For LTV types of silicone rubber and fluorosilicone rubber the curing mechanism is similar to that of the RTV types. However, with these types, after the primary agents and curing agents are mixed together, the material is heated to a temperature in the range about 100° C. to 150° C. to promote rapid curing.

HTV types of silicone rubber and fluorosilicone rubber are also referred to as hot curing types because they contain a curing agent and a polyorganosiloxane with a high degree of polymerization, resulting in a rubber after vulcanization initiated by heating to a temperature of at least 150° C. HTV types include radical reaction types and addition reaction types, although the radical reaction types are more generally used and more practical. These radical reaction types involve the use of an organic peroxide as a vulcanizing agent. When heated to at least the decomposition temperature of the vulcanizing agent, the vulcanizing agent decomposes and produces free radicals. The free radicals excite the organic groups of the silicone or fluorosilicone polymer, resulting in the gradual formation of a network structure which becomes the rubber.

Ultraviolet radiation curing silicone rubber and fluorosilicone rubber are formed using similar materials and by similar reactions as described above except that curing agents are used by which curing is induced by exposure to ultraviolet radiation.

The fluorocarbon rubber can be, for example, a copolymer of vinylidene fluoride and hexafluoropropylene or other fluorocarbon elastomer having good resistance to heat, oil, and solvents. Suitable fluorocarbon rubbers are known in the art and are available commercially, for example, under the tradenames of Viton® and Daiel®.

Referring to FIG. 1, the elastic porous body material 1 made of rubber foam of the material described above is highly elastic and resilient. The rubber foam should have a pore volume in the range 30% to 95%, preferably in the range 50% to 90%. Rubber foam with a pore volume greater than 90% is too weak and has low durability. Rubber foam with a pore volume less than 30% has too little porous cellular structure to provide the elasticity, compliance, and resilience characteristics desired in the body material. Surface hardness of the rubber foam should be 70 degrees or less, preferably 50 degrees or less, as measured by Japan Rubber Association Standard SRIS-101. Surface hardness greater than 70 degrees creates excessive stiffness in the body material and thereby also fails to provide the desired elasticity, compliance and resilience characteristics. Preferably, the thickness of the rubber foam is in the range 5 millimeters to 30 millimeters.

The release surface material 5 is a composite material which is adhered to the outer surface of the elastic porous body material 1 and comprises a porous polytetrafluoroethylene film 3 impregnated with a synthetic rubber 4. The synthetic rubber 4 impregnated into the porous polytetrafluoroethylene film 3 is preferably a silicone rubber, fluorosilicone rubber, or fluorocarbon rubber of the types described above. The thickness of the release surface material 5 should be in the range 3 micrometers to 1000 micrometers. When the thickness is greater than 1000 micrometers the release surface material is too stiff and the elasticity and compliance properties of the body material cannot be taken advantage of. Conversely, when the thickness is less than about 3 micrometers, the surface material is quite weak and lacks durability in use.

Porous polytetrafluoroethylene sheet or film suitable for use in the invention can be made by processes known in the art, for example, by stretching or drawing processes, by papermaking processes, by processes in which filler materials are incorporated with the PTFE resin and are subsequently removed to leave a porous structure, or by powder sintering processes, Preferably the porous polytetrafluoroethylene film 3 is porous expanded polytetrafluoroethylene film having a structure of interconnected nodes and fibrils, as described in U.S. Pat. Nos. 3,953,566 and 4,187,390 which fully describe the preferred material and processes for making them. The porous polytetrafluoroethylene film 3 of the release surface material 5 should have a thickness in the range 3 to 1,000 micrometers, preferably in the range 5 to 100 micrometers; a pore volume in the range 20 to 98 percent, preferably in the range 50% to 90%; and a nominal pore size in the range 0.05 to 15 micrometers, preferably in the range 0.1 to 2 micrometers.

The composite material of the release surface material 5 is made by combining the porous polytetrafluoroethylene film 3 with a synthetic rubber 4 so that the synthetic rubber is contained substantially within, and supported by, the polytetrafluoroethylene film. Examples of methods which can be used to form the composite material include methods in which the porous polytetrafluoroethylene film is impregnated with uncured synthetic rubber, which is then cured; or a method in which polytetrafluoroethylene resin is mixed and compounded with uncured synthetic rubber and formed into a coherent sheet or film by methods known in the art, after which the synthetic rubber is cured. The amount of synthetic rubber incorporated with the polytetrafluoroethylene film should be such that it is equal to about 70% to 110%, preferably 80% to 100%, of the pore volume of the polytetrafluoroethylene film. An amount exceeding 110% of the pore volume of the polytetrafluoroethylene film results in an excess of synthetic rubber present on the film surface which can lead to problems, such as swelling of the rubber on the surface or separation of the rubber layer from the surface, so that adequate durability cannot be ensured. An amount of synthetic rubber less than 70% of the pore volume results in poor surface smoothness and diminished release properties.

To improve the performance of the release surface material 5 the synthetic rubber 4 of the composite may also include other materials, for example,such as silicone oil or other release agent to improve release properties, or fillers such as carbon black, graphite, boron nitride, alumina, silica, and other powders to impart thermal conductivity, electrical conductivity, wear resistance, and other useful properties to the release surface material.

Referring again to FIG. 1, the release surface material 5 comprising a porous polytetrafluoroethylene film 3 containing a cross-linked synthetic rubber 4 is adhered to the elastic porous body material 1 by a non-continuous layer of adhesive 6. It is important that that the elastic and compliance properties of the body material be minimally affected by the adhesive layer. Therefore, a non-continuous layer of adhesive is preferred, for example, as obtained by printing a pattern of discrete dots or lines of adhesive on the surface of the body material 1 or on the porous polytetrafluoroethylene film 3, before or after it has been impregnated with the synthetic rubber 4. Any adhesive can be used so long as it has sufficient heat resistance and chemical stability for the application, and can strongly join the release surface material to the body material by adhesive attachment or by mechanical anchoring such as is obtained by slight penetration of the adhesive into the pores of the surface region of the materials to be joined. Suitable adhesive materials include, but are not limited to, polyimide, epoxy, cyanate ester, polyamide, or phenol type adhesives, and the like. Also acceptable is a non-continuous layer of adhesive formed of an open porous non-woven web or mesh of synthetic thermoplastic polymer.

It has also been determined that an elastic fixing roll of the invention can be made in which the body material is not entirely formed of a porous synthetic rubber foam, so long as the necessary elasticity and compliance can be developed at the surface of the roll. The body material of such a roll can be made of stiffer, more open material which is less expensive and more easily fabricated than a synthetic rubber foam of silicone rubber, fluorosilicone rubber or fluorocarbon rubber. Such a roll is depicted in FIG. 2 and described hereinbelow.

Figure 2:
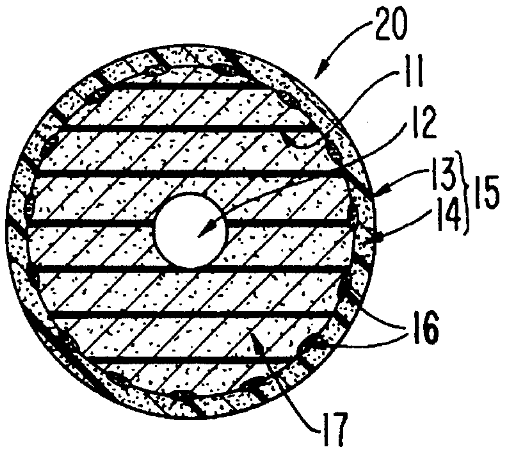
FIG. 2 is a cross-sectional view of an embodiment of the invention which has a reinforcing material.

In FIG. 2 is shown an elastic fixing roll 20 of the invention in which a non-rigid porous body material 11 is axially mounted on a metal shaft 12. The porous body material 11 contains a reinforcing material 17 adhered to the internal surface of the body material 11. A release surface material 15 comprising a porous polytetrafluoroethylene film 13 impregnated with a synthetic rubber 14 is adhered to the outer surface of the body material 11 by a non-continuous layer of adhesive 16.

The porous body material 11 should be a non-rigid open-celled foam or other continuous pore structure having a pore volume of at least 30%, preferably in the range 50% to 90%. Suitable non-rigid porous materials are commercially available and can be of synthetic polymers such as, but not limited tó, polyester polyurethane, polyether polyurethane, polyvinyl chloride, polyethylene, polystyrene, and the like. By non-rigid is meant that the material is not a hard, stiff, brittle material.

A porous elastic reinforcement 17 is formed within the porous body material 11 contiguous with the release surface material 15 and extending throughout the porous body material. The reinforcing material 17 is silicone rubber, fluorosilicone rubber, or fluorocarbon rubber applied in liquid form to the surface of the porous body material 11 so as to impregnate the porous body material. The impregnated body material is then flexed, for example, by rolling it or wringing it, to squeeze out excess liquid and to distribute the liquid rubber in the pores of the body material so as to coat the internal surfaces of the porous support material; and thereby maintaining porosity within the reinforcing region. Such a method of coating a non-rigid porous material is disclosed in Japanese Laid-Open Patent Application 58-17129.

The amount of silicone rubber, fluorosilicone rubber, or fluorocarbon rubber impregnated into the porous body material to form the reinforcing region should be such that the bulk density of the porous body material is in the range 50 to 300 $kg/m^3$, preferably in the range 100 to 200 $kg/m^3$.

When the amount of rubber forming the reinforcing region increases the bulk density to more than about 300 kg/$m^3$ the result is diminished pore volume as well as inadequate elasticity and resilience, so that sufficient flexibility and surface compliance is not obtained. When the amount of rubber forming the reinforcing region increases the bulk density to less than 50 kg/$m^3$, the internal surfaces of the pores in the reinforcing region of the body material are insufficiently coated with rubber to provide reinforcement, heat resistance or durability. The reinforced body material produced as described has good surface elasticity and resilience. The surface hardness should be 70 degrees or less, preferably 50 degrees or less, and the pore volume should be in the range 30% to 95%, preferably in the range 50 to 90%.

As described earlier, the release surface material 15 is a composite material which is adhered to the outer surface of the elastic reinforced porous body material 11 and comprises a porous polytetrafluoroethylene film 13 impregnated with a synthetic rubber 14. The release surface material 15 is prepared in the same manner and with the same materials as specified hereinabove in the description of the first embodiment of the invention. Likewise, the release surface material 15 is adhered to the porous reinforced body material 11 by a non-continuous layer of adhesive 16 as described earlier. Again, strong bonding is achieved between the release surface material and the reinforced body material.

Referring still to FIG. 2, the release surface material 15 comprising a porous polytetrafluoroethylene film 13 containing a cross-linked synthetic rubber 14 is adhered to the cross-linked synthetic rubber forming the elastic reinforcement 17 in the porous body material 11 by a non-continuous layer of adhesive 16. As in the case described above, it is important that that the elastic and compliance properties of the body material be minimally affected by the adhesive layer, and a non-continuous layer of adhesive is also preferred. The adhesive is applied in the same manner and is of the same material as described above.

Figure 3:
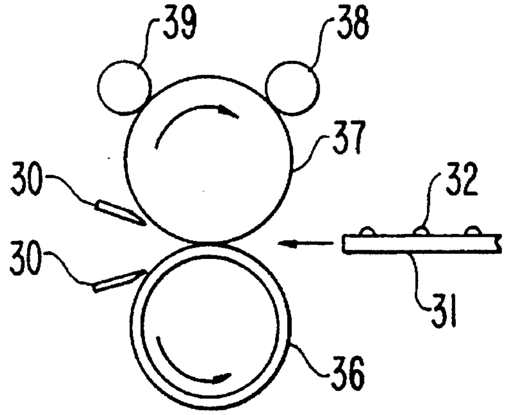
FIG. 3 is a side schematic view of a toner fixation assembly of a PPC machine incorporating an embodiment of the invention.

In FIG. 3 is shown a side schematic view of a toner fixation assembly of a PPC machine. The schematic view depicts a heated metal roll 37 pressing against the elastic fixing roll 36 of the invention. An oil application roll 38 contacts the fixing roll and applies a release agent to the fixing roll surface to minimize toner pickup and facilitate its removal. A substrate 31 printed with an unfixed toner image 32 is seen prepared to pass through the nip between the heated metal roll 37 and the elastic fixing roll 36. Guide bars 30 guide the substrate away from the assembly after it passes through the nip. Cleaning roll 39 removes toner and release agent from the surface of the heated metal roll.

The advantages provided by the elastic fixing roll of the invention are many. The composite release surface material through its combination of porous expanded polytetrafluoroethylene film with silicone rubber, fluorosilicone rubber or fluorocarbon rubber provides excellent release properties, oil swelling resistance, mechanical strength, and wear resistance. It is also highly resistant to heat and is capable of operating in the temperature range 200° C. to 250° C. The network of expanded polytetrafluoroethylene throughout the structure significantly increases the strength of the composite while providing support to the synthetic rubber contained therein, without adversely influencing the elasticity, compliance or resilience of the rubber. The soft, flexible body material provides for increased nip width without requiring increased roll diameter or harmfully high compressive forces and is sufficiently compliant to effectively process paper materials, even those of differing thicknesses such as an envelope, without smearing the images or wrinkling the paper. Because of the excellent bonding between the release surface material and the body material exceptional peeling resistance at the interface between them is obtained.

EXAMPLE 1

An elastic fixing roll 10 as shown in FIG. 1 was prepared as follows.

An 8 mm diameter steel shaft 2 was inserted axially into an elastic porous body material I of silicone rubber foam. The silicone rubber foam had an outside diameter of 30 mm, and inside diameter of 8 mm, and a bulk density of 330 kg/$m^3$. The surface hardness of the silicone rubber foam was 28 degrees.

A gravure printed pattern of 0.5 mm dots 6 of thermosetting epoxy adhesive was applied to the surface of the silicone rubber foam body material I and air dried.

A porous expanded polytetrafluoroethylene film 3 having a thickness of about 20 micrometers, a nominal pore size of about 2 micrometers, and a pore volume of about 90% was wrapped one turn around the body material 1 of silicone rubber foam to form a single layer with a slight edge overlap. The assembly was heated to fuse the epoxy adhesive and adhere the porous expanded polytetrafluoroethylene film 3 to the body material 1.

An RTV silicone rubber (KE-106, manufactured by Shin-Etsu Chemical Co., Ltd.) was applied to the surface of the assembly and impregnated into the porous polytetrafluoroethylene film to substantially fill the pore volume. The excess silicone rubber was wiped from the porous expanded polytetrafluoroethylene film surface and the roll was heated in a high temperature tank at 100° C. for one hour to cross-link and cure the silicone rubber. The composite release surface material 5 formed of the porous expanded polytetrafluoroethylene and cross-linked RTV silcone rubber 4 had a thickness of about 40 micrometers. The outside diameter of the elastic fixing roll 6 thus formed was about 30 mm, and the surface hardness of the roll was 30 degrees.

The elastic fixing roll was tested in a plain paper copying machine as a pressure roll in a toner fixation assembly of the type shown in FIG. 3. Good release properties and durability were obtained when the roll was put under constant pressure. No offset printing problems occurred during a copy test of 100,000 paper sheets, nor was any toner found adhering to the surface of the elastic fixing roll at the conclusion of the test. No deterioration as a result of swelling caused by release oil was found. A copy test involving the use of printed substrates in the form of envelopes having seams with differences in thickness of 120 micrometers produced no wrinkles or the like in the substates, and resulted in good copy images.

EXAMPLE 2

An elastic fixing roll 20 as shown in FIG. 2 was prepared as follows.

An 8 mm diameter shaft 12 was inserted axially into a porous body material 11 of open-cell polyester polyurethane foam. The polyester polyurethane had an outside diameter of 30 mm and an inside diameter of 8

A reinforcing material 17 was impregnated into the body material 11 as follows:

A predetermined amount of addition reaction hardening silicone rubber (KE1300, manufactured by Shin-Etsu Chemical Co., Ltd.) was poured on a plate glass surface. The polyester polyurethane foam body material 11 was rolled in the liquid silicone rubber until it was impregnated into the porous support material. The impregnated support material was then repeatedly rolled on a corrugated surface causing it to flex, thus distributing the liquid silicone rubber in the pores of the body material so as to coat the internal surfaces of the porous body material and thereby maintaining internal porosity of interconnected pores through the reinforced body material. The reinforced porous body material had a surface hardness of 13 degrees and a bulk density of 220 kg/m$^3$.

The release surface material 15 was prepared and adhered as described in Example 1. The finished elastic fixing roll had a surface hardness of 15 degrees.

The elastic fixing roll of Example 2 was examined and tested as described in Example 1. The results of the tests were the same as reported in Example 1.

COMPARATIVE EXAMPLE 1

A comparative example of an elastic fixing roll was prepared as described in Example 1, except that a solid non-porous silicone rubber roll was used instead of a porous foam body material of silicone rubber. The solid silicone rubber roll had a surface hardness of 75 degrees and a bulk density of 1140 kg/m$^3$.

The solid elastic fixing roll was tested in a plain paper copying machine as a pressure roll in a toner fixation assembly of the type shown in Figure. Good release properties and durability were obtained when the roll was put under constant pressure. No offset printing problems occurred during a copy test of 100,000 paper sheets, nor was any toner found adhering to the surface of the elastic fixing roll at the conclusion of the test. No deterioration as a result of swelling caused by release oil was found. However, a copy test involving the use of printed substrates in the form of envelopes having seams with differences in thickness of 120 micrometers produced wrinkles in the substates, and good copy images could not be obtained.

We claim:

1. An elastic fixing roll comprising:

(a) a release surface material comprising porous polytetrafluoroethylene film impregnated with cross-linked synthetic rubber, said release surface material being 3 to 1000 micrometers thick;

(b) a porous body material comprising open-celled synthetic polymer foam, said open-celled foam having a pore volume in the range 30 percent to 90 percent, and having the internal surfaces of its pores coated with a reinforcing material of cross-linked synthetic rubber so as to maintain porosity in the reinforced foam, said porous body material having a bulk density in the range 50 to 300 kg/m$^3$ and a surface hardness of 70 degrees or less;

wherein said release surface material is adhered to the outer surface of said porous body material by a non-continuous layer of adhesive.

2. The elastic fixing roll as recited in claim 1, wherein the synthetic rubber of said release surface material is selected from the group consisting of silicone rubber, fluorosilicone rubber, and fluorocarbon rubber; and wherein the synthetic rubber of said porous body material, which may be different from the rubber used in said release surface material, is selected from the group consisting of silicone rubber, fluorosilicone rubber, and fluorocarbon rubber.

3. The elastic fixing roll as recited in claim 1, wherein the porous polytetrafluoroethylene film is porous expanded polytetrafluoroethylene film.

4. The elastic fixing roll as recited in claim 2, wherein the porous polytetrafluoroethylene film is porous expanded polytetrafluoroethylene film.

* * * * *